US008265924B1

(12) United States Patent
Cutler

(10) Patent No.: US 8,265,924 B1
(45) Date of Patent: Sep. 11, 2012

(54) MULTIPLE LANGUAGE DATA STRUCTURE TRANSLATION AND MANAGEMENT OF A PLURALITY OF LANGUAGES

(75) Inventor: Seth A. Cutler, Raleigh, NC (US)

(73) Assignee: Teradata US, Inc., Dayton, OH (US)

( * ) Notice: Subject to any disclaimer, the term of this patent is extended or adjusted under 35 U.S.C. 154(b) by 628 days.

(21) Appl. No.: 11/244,602

(22) Filed: Oct. 6, 2005

(51) Int. Cl.
G06F 17/28 (2006.01)
G06F 17/20 (2006.01)
G10L 21/00 (2006.01)

(52) U.S. Cl. ............ 704/8; 704/2; 704/3; 704/4; 704/7; 704/270; 704/270.1

(58) Field of Classification Search ............... 704/1–10, 704/270.1, 270; 717/162, 163, 169, 170, 717/136, 161; 715/703, 229; 707/4, 736, 707/757

See application file for complete search history.

(56) References Cited

U.S. PATENT DOCUMENTS

| | | | | |
|---|---|---|---|---|
| 4,566,078 A * | 1/1986 | Crabtree | | 704/8 |
| 5,428,772 A * | 6/1995 | Merz | | 707/4 |
| 5,765,131 A | 6/1998 | Stentiford et al. | | |
| 5,884,247 A | 3/1999 | Christy | | |
| 5,974,372 A * | 10/1999 | Barnes et al. | | 704/8 |
| 5,987,401 A | 11/1999 | Trudeau | | |
| 6,092,036 A * | 7/2000 | Hamann | | 704/8 |
| 6,233,544 B1 | 5/2001 | Alshawi | | |
| 6,330,529 B1 * | 12/2001 | Ito | | 704/3 |
| 6,434,518 B1 | 8/2002 | Glenn | | |
| 6,446,036 B1 * | 9/2002 | Bourbonnais et al. | | 704/3 |
| 6,526,426 B1 * | 2/2003 | Lakritz | | 715/264 |
| 6,598,015 B1 | 7/2003 | Peterson et al. | | |
| 6,687,736 B1 * | 2/2004 | Lee | | 709/203 |
| 6,789,093 B2 | 9/2004 | Obuchi et al. | | |
| 6,857,022 B1 * | 2/2005 | Scanlan | | 709/229 |
| 6,865,716 B1 * | 3/2005 | Thurston | | 715/207 |
| 7,231,342 B2 * | 6/2007 | Edwards et al. | | 704/3 |
| 7,418,390 B1 * | 8/2008 | Jokipii | | 704/270.1 |
| 7,447,624 B2 * | 11/2008 | Fuhrmann | | 704/8 |
| 7,568,196 B2 * | 7/2009 | Krebs | | 718/100 |
| 7,650,276 B2 * | 1/2010 | O'Neil et al. | | 704/8 |
| 7,698,126 B2 * | 4/2010 | Kohlmeier et al. | | 704/8 |
| 7,721,271 B2 * | 5/2010 | Pournasseh et al. | | 717/137 |
| 7,761,288 B2 * | 7/2010 | Parnell et al. | | 704/2 |
| 7,788,648 B2 * | 8/2010 | Bossom et al. | | 717/136 |

(Continued)

FOREIGN PATENT DOCUMENTS

JP 2003058541 A * 2/2003

OTHER PUBLICATIONS

N.N. Vuong, G.S. Smith, and Y. Deng, "Managing security policies in a distributed environment using extensible markup language (XML)," Symposium on Applied Computing, Mar. 2001.*

(Continued)

Primary Examiner — Douglas Godbold
Assistant Examiner — Edgar Guerra-Erazo
(74) Attorney, Agent, or Firm — Schwegman, Lundberg & Woessner

(57) ABSTRACT

Techniques are presented for automatic language translation and management. A master language data structure houses information in a base language and houses linkages to the information for translations in a plurality of different languages. The information and translations are created, updated, managed, and distributed from the master language data structure on demand.

12 Claims, 3 Drawing Sheets

U.S. PATENT DOCUMENTS

| | | | |
|---|---|---|---|
| 7,865,358 B2* | 1/2011 | Green et al. | 704/10 |
| 7,882,116 B2* | 2/2011 | Gutz et al. | 707/756 |
| 7,970,599 B2* | 6/2011 | Lei et al. | 704/8 |
| 8,126,702 B2* | 2/2012 | Lang et al. | 704/8 |
| 2002/0087915 A1* | 7/2002 | Perla et al. | 714/15 |
| 2002/0116172 A1* | 8/2002 | Vargas | 704/8 |
| 2002/0120762 A1* | 8/2002 | Cheng et al. | 709/230 |
| 2002/0162090 A1* | 10/2002 | Parnell et al. | 717/120 |
| 2003/0005001 A1* | 1/2003 | Kataoka | 707/513 |
| 2003/0046058 A1* | 3/2003 | Stuckler et al. | 704/7 |
| 2003/0110154 A1* | 6/2003 | Ishihara et al. | 707/1 |
| 2003/0126559 A1* | 7/2003 | Fuhrmann | 715/513 |
| 2003/0158871 A1* | 8/2003 | Fomenko | 707/203 |
| 2004/0102956 A1* | 5/2004 | Levin | 704/2 |
| 2004/0103405 A1* | 5/2004 | Vargas | 717/137 |
| 2004/0205671 A1* | 10/2004 | Sukehiro et al. | 715/532 |
| 2005/0154705 A1* | 7/2005 | Zwiegincew et al. | 707/1 |
| 2005/0273709 A1* | 12/2005 | Lough et al. | 715/517 |
| 2006/0080079 A1* | 4/2006 | Yamabana | 704/2 |
| 2006/0080082 A1* | 4/2006 | Ravindra et al. | 704/8 |
| 2006/0130031 A1* | 6/2006 | McHugh et al. | 717/162 |
| 2006/0130032 A1* | 6/2006 | McHugh et al. | 717/162 |
| 2006/0150173 A1* | 7/2006 | McHugh et al. | 717/162 |
| 2006/0206877 A1* | 9/2006 | Kohlmeier et al. | 717/137 |
| 2006/0271352 A1* | 11/2006 | Nikitin et al. | 704/9 |
| 2007/0226168 A1* | 9/2007 | Mukundan et al. | 707/1 |

OTHER PUBLICATIONS

Young-Gab Kim; Chang-Joo Moon; Dae-Ha Park; Doo-Kwon Baik; , "A service bundle authentication mechanism in the OSGi service platform," Advanced Information Networking and Applications, 2004. AINA 2004. 18th International Conference on ,vol. 1, No., pp. 420-425 vol. 1, 2004.*

Collins, R. (2002). Software localization for internet software: Issues and methods. IEEE Software, 19(2), 74-80.*

* cited by examiner

MULTIPLE LANGUAGE DATA STRUCTURE TRANSLATION AND MANAGEMENT OF A PLURALITY OF LANGUAGES

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screen shots which may be described below and in the drawings that form a part of this document: Copyright© 2005, NCR Corp. All Rights Reserved.

FIELD

The invention relates generally to data processing and more particularly to techniques for automatic language translation and management.

BACKGROUND

As the world community follows the information boom, there are more and more software services and information repositories that are being provided in languages other than English. Consequently, content providers and software providers have established a world-wide customer base. For the most part the information or software services that are provided to an English customer base are no different than what is needed for different world-wide customer base. However, one significant distinction is the new need to provide existing information and existing software services in different languages so as to be understood by the different world-wide customers.

One problem associated with providing information or services in multiple languages is versioning control and management. Conventionally, a plurality of parties is needed to manage and distribute information or services in a plurality of languages. Many of these parties are also geographically dispersed across the globe, which makes sense because often translators for a given language are best found and located in their native countries. Each party may have its own document management or inventory control system for the information that each party produces. Thus, it can be seen that this is a complex and expensive management task, which can be potentially distributed across the entire globe.

Moreover, even when a decent approach is employed by an enterprise for language translation and management that approach can rapidly break down in a dynamic environment. For example, consider information that is frequently modified, when a modification occurs each translated version of the information has to be updated and synchronized with the modified version. This can entail a lot of manual coordination, which must comport with different world-wide time zones and different world-wide work schedules. Further, this work may be needed each time the information is changed. Also, in some environments the information may change in any of the supported languages, which can compound the management problem even further.

As a result, product releases may have to be put on different world-wide schedules in order for an enterprise to maintain revenue streams. That is, an English version of a product may go out months in advance of a Japanese version of the product. Enterprises would prefer to release at one synchronized date and time, but that goal appears unreachable or impractical in view of the effort needed to acquire and synchronize language translations for a product release.

Thus, it can be seen that improved language translation and management techniques are desirable in a global economy.

SUMMARY

In various embodiments, techniques for automatic language translation and management are provided. In an embodiment, a language translation and management system is taught. The language translation and management system includes a language creator, a language linker, and a language distributor. The language creator is to create entries for a base language in a master language data structure. The language linker links a single additional entry for each entry in the master language data structure. Each single additional entry is associated with an each different supported language, and the language distributor is to distribute selective ones of the entries or selective ones of the additional entries.

DETAILED DESCRIPTION

Figure 1:
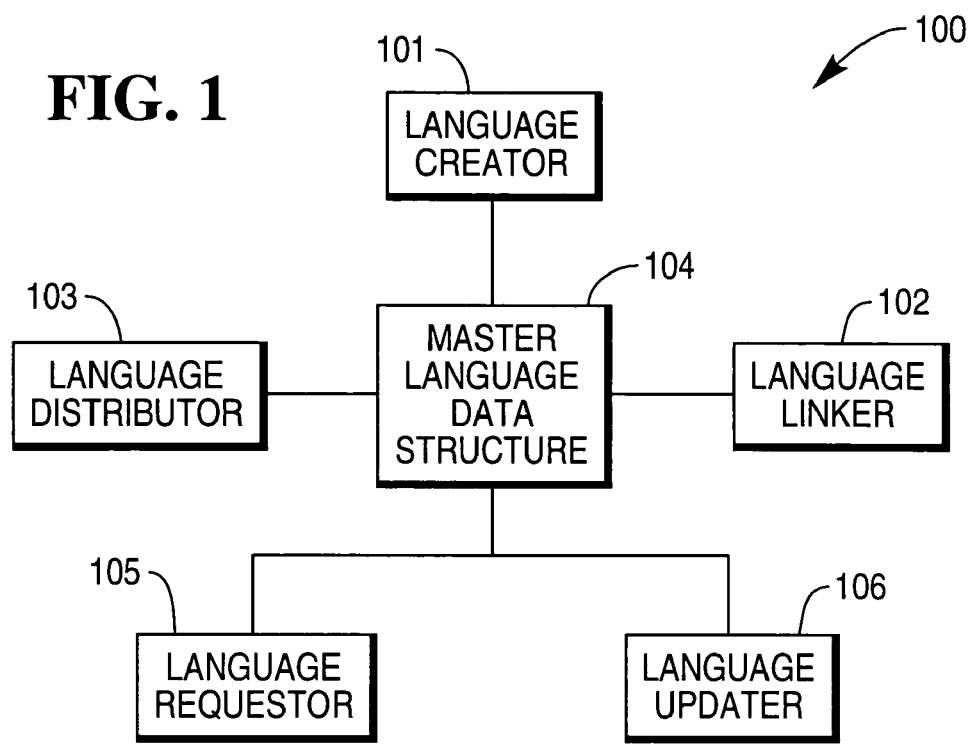
FIG. 1 is a diagram of a language translation and management system, according to an example embodiment.

FIG. 1 is a diagram of a language translation and management system 100, according to an example embodiment. The language translation and management system 100 is implemented in a machine-accessible or computer-readable medium and is accessible over a network. The network may be wired, wireless, or a combination of wired and wireless.

FIG. 1 is presented for purposes of illustration only and is not intended to limit embodiments of the language translation and management system 100, since it is readily apparent that some components of the FIG. 1 may be subsumed into other components, that additional components may be added, and/or that some components may be deleted; all without departed from the beneficial teachings presented herein and below.

The language translation and management system 100 includes a language creator 101, a language linker 102, and a language distributor 103. The components 101-103 of the language translation and management system 100 create, manage, and interact with a master language data structure 104. In some embodiments, the language translation and management system 100 may also include a language requestor 105 and/or a language updater 106. Each of these will now be discussed in turn.

The language creator 101 is responsible for initially populating the master language data structure 104 with strings or identifiers for files with a base language. In an embodiment, the base language is the English language. However, it is to be understood that any language may be configured to be a desired base language.

A base language is used for purposes of versioning control. It is the native language of the strings or identifiers for files included within the master data structure 104. It will be demonstrated below how different supported languages for the strings or the files are linked to the base language strings or file identifiers within the master language data structure 104.

The language creator 101 is designed to be processed once upon initialization of the master language data structure 104. In some embodiments, the language creator 101 parses a given directory or repository for purposes of acquiring the base language strings or identifiers for files. That is, a command line option to the language creator 101 may identify a directory or data store table where the strings and files are located.

The master language data structure 104 may be housed in a file or in a data store table. In some embodiments, the master language data structure may be housed wholly or partially in memory. According to an embodiment, the master language data structure 104 is an extensible markup language (XML) encoded file.

The master language data structure 104 houses the base language strings or file identifiers as entries within the data structure 104. Each entry may include an identifier to unique reference that particular entry. The identifier may itself be a string, such as a label. Alternatively, the identifier may be a numeric code or a combination of strings and codes. Each identifier with the data structure 104 includes its base language entry and a plurality of additional entries, where each additional entry is associated with a translation of the base language entry in a different supported language format.

For example, consider a base language entry for an error message of a customer management relationship (CRM) software service; the entry is in a base language of English and includes the string "Hello." In this example, the data structure 104 may include an identifier of "001" that includes the entry "Hello" and that includes an additional entry for the Spanish language under the same "001" identifier as "Hola."

The language linker 102 is used to link each entry of the master language data structure 104, which is in the base language, with additional entries that are in the different supported languages. Similar to the language creator 101, the language linker 102 is designed to be processed after the base language entries are added to the master language data structure 104.

In an embodiment, each different supported language entry may be housed in different data store tables, different directories, and/or different repositories. Alternatively, each entry that is not in the base language format may be housed in the same data store table, same directory, or same repository. The language linker 102 may be provided a command line argument or inspect profiles or even environmental variables to acquire the appropriate locations for the translated entries that are to be linked within the master language data structure 104.

According to an embodiment, the language linker 102 is able to match each different supported language entry to the appropriate base language entry in the master language data structure 104 through the use of an entry identifier. The entry identifier may be used as metadata associated with the different supported language entries or may be included in the names of those entries. Alternatively, each repository, directory, or data store may be organized around a given base language entry identifier.

The additional entries for different supported languages can be acquired in a variety of manners. For example, automated language services may be capable of automatically translating the base language entry into a desired target language. In other cases, a straight automated translation may not be possible; in such situations external or manual translation services may be used to acquire a translation to a target language.

Once the master language data structure 104 is populated by the language creator 101 and linked to desired target language translations by the language linker 102, the information or entries included in the master language data structure 104 is ready to be distributed on demand by the language distributor 103.

The language distributor 103 handles access requests to the master language data structure 104. Requests may be made by automated resources, such as automated software resources. Alternatively, requests may be made by manual resources, such as administrators or end users, via interfaces to the language distributor 103.

The language distributor 103 may enforce security on requests made by the resources and may priorities requests for purposes of load balancing. The language distributor 103 may also restrict or idle requests if the master language data structure 104 is being updated or modified.

The language distributor 103 receives a request for information. The request also identifies the desired or target language for the information being requested. Armed with this information, the language distributor 103 acquires a unique identifier for an entry within the master language data structure 104 and acquires the information in the target language format. The information is then distributed to the requesting resource or requestor in the target language format.

A variety of techniques may be used by the language distributor 103 to locate the desired information of a request in the master language data structure 104 and the corresponding translation in the target language. For example, the request may include the proper entry identifier for the base language entry of the information in the master language data structure 104. Alternatively, the information may be hashed to acquire the proper entry identifier. Still further, the information may be supplied in the base language and the master language data structure 104 searched for the information. The proper translation entry may be found by using codes for the different supported languages included within the master language data structure 104. For example, the Korean language may use a three digit label as KOR, Chinese may use CHS, and French may use FRA, and so on. So, the language distributor 103 locates the proper entry location for the base language for the requested information, and then uses another sub-identifier to acquire the proper translation entry for the requested information. A variety of other techniques may also be used and are intended to fall within the scope of the embodiments presented herein.

In some embodiments, the language translation and management system 100 may also include a language requestor 105. The language requestor 105 is an automated service that contacts or initiates a process for acquiring a translation of a base language entry in a different supported language.

For example, the language requestor 105 may be activated after the language creator 101 initially populates the master language data structure 104 with base language entries. Upon activation, the language requestor 105 interacts with automated services or initiates manual services to have each base language entry translated into a desired different supported language.

The language requestor 105 may also acquire the translations as they are provided and proper locate them within the proper locations that are processed by the language linker 102. In some cases, the language requestor 105 may automatically initiate the language linker 102 once the desired translations are acquired and placed in the proper locations to be processed by the language linker 102.

According to an embodiment, the language translation and management system 100 may also include a language updater 106. The language updater 106 may monitor directories, repositories, or data store tables for added base language strings or files. If a new string or file is detected, then the language updater 106 initiates an add entry process to update the master language data structure 104 with the new string or file. The language updater 106 may also contact the language requestor 105, if present, and the language linker 102 to acquire the translations for the new string or file and to properly link the translations with the newly added entries.

In some embodiments, the language updater 106 may also monitor the base language data locations for modifications or changes to existing entries, which are included in master language data structure 104. In this manner, the language updater 106 may be used to detect changes to existing entries, update them, and initiate re-links to ensure updated translations are properly associated in the master language data structure 104. In fact, in some situations the language updater 106 may monitor the different supported language data locations for modifications or changes to keep the base language entries and the other supported language entries of the master data language structure in synchronization with one another.

In an example embodiment, of the language translation and management system 100, the components 101-103 are implemented at least partially in a parser utility within JAVA® to create and maintain an XML list of strings (master data structure 104) for a form processing service, such that the form may be rendered into a plurality of different languages. The form processing service is Delphi®. Of course it is again to be understood that Delphi® is but one programming language and that any may be used, but Delphi® is just being presented for purposes of illustration with the example. The base language of the strings is English. Strings are populated, linked, updated, and distributed from the list via the above-described components of the language translation and management system 100.

One implementation of the above provided example may proceed as follows. The machine where the parser utility executes includes several .JAR files to exist in its CLASSPATH environmental variable. In addition to a JAVA® runtime, "jdom.jar," "antlr.jar," "parsedfm.jar," and "common.jar" are referenced within the CLASSPATH. The "common.jar" file is part of a Build Automation suite. There is also a sample batch file called "setpath.bat" in a source directory that correctly configures the CLASSPATH for compilation and execution. A "processdfm.jar" is the end result of the build process. The parser utility is referred to as "DFM" for a Delphi® Form Management service. Example execution of such an environment now follows.

The DFM parse utility is invoked from JAVA® runtime using the following example format:

```
java ProcessDFM <Create|Merge|Update|Join|Generate> <Language> {Directory}
            © NCR Corporation 2005
```

The commands Create, Merge, Update, Join, and Generate are processed by various ones of the above-described components of the language translation and management system 100. The parameter descriptions are as follows. The first command argument may either be a Create, a Merge, an Update, a Join, or a Generate. The second command argument is a language argument; it is a three-letter code associated with a desired language, e.g., ENU for English, ESN for Spanish, etc. The third command argument is a directory argument; it is a directory tree (repository or location) where the DFM source files or strings are located.

Some sample executions are now provided for purposes of further illustration.

Here is a sample of a series of commands that would create the initial resource document (master language data structure 104) from all the DFM files for a Teradata® CRM product, distributed by NCR Corporation of Dayton, Ohio:

```
java ProcessDFM create ENU W:\crm\src\Delphi\Source
java ProcessDFM merge DEU W:\crm\src\Delphi\Language\DEU
java ProcessDFM merge ESN W:\crm\src\Delphi\Language\ESN
java ProcessDFM merge FRA W:\crm\src\Delphi\Language\FRA
java ProcessDFM merge KOR W:\crm\src\Delphi\Language\KOR
            © NCR Corporation 2005
```

The create operation initiates the language creator 101 and the merge operation initiates the language linker 102. That is, the language linker may be viewed as a merger service as well. The three character codes DEU, ESN, FRA, and KOR map to desired target language translations.

Next is a sample of the update command that would be executed after subsequent builds or as software is altered where the resource needs to be updated or refreshed:

```
java ProcessDFM update ENU W:\crm\src\Delphi\Source
            © NCR Corporation 2005
```

After a translated update.xml document is received from a translation partner or acquired from a language requester 105, the following join command merges its content back into the resource.xml document, where the resource.xml document is the master language data structure 104. Note that the second and third parameters are not provided in this context:

java ProcessDFM join
© NCR Corporation 2005

Finally, the commands to generate DFM files for the various other languages:

```
java ProcessDFM generate DEU W:\crm\src\Delphi\Language\DEU
java ProcessDFM generate ESN W:\crm\src\Delphi\Language\ESN
java ProcessDFM generate FRA W:\crm\src\Delphi\Language\FRA
java ProcessDFM generate KOR W:\crm\src\Delphi\Language\KOR
            © NCR Corporation 2005
```

If any DFM file, in the example provided, fails to parse or some severe error should occur, the output ordinarily written to resource.xml are written instead to a resource_error.xml file in order to avoid corrupting the original version. The errors that caused the failure may appear in the log, and the utility may count the number of failures and report that figure at the end of processing, for example:

```
WARNING: 9 files failed to parse correctly.
Output was written to "resource_error.xml".
            © NCR Corporation 2005
```

In some cases some files located within processing directories are not designed to be processed. That is, certain DFM files in an example Delphi® source tree may be in binary format, which may have been used in a previous version of Delphi®. These files are not be parsed by the utility and if present can generate errors when processing occurs. To exclude these files from consideration, execute the create command, and then modify the resource_error.xml file to exclude the files. To exclude files, edit the <dfmFile> tag by adding an attribute called "ignore" with a value of "true." Then rename resource_error.xml to resource.xml and continue with the merge of other language files.

```
<dfmFile name="AppBroker\CIOSBrokerMainForm.dfm" ignore=true>
{ remove elements that might appear here to save space }
</dfmFile>
                    © NCR Corporation 2005
```

Ignored files are skipped by the utility in future invocations. This is also useful for other DFM files that are no longer in use. Excluding these files can improve the processing time and can reduce the final size of the resource.xml file.

A sample output of the resource.xml file or the master language data structure 104 for the provided example implementation is now provided:

Sample resource.xml Contents for Example

```
<Resource>
  <dfmFile name="*Source\AppBroker\CIOSBrokerMainForm.dfm">
    <dfmElement item_name="*/frmCIOSBroker/pagAppBroker/tabGrid/PollInterval/Hint">
      <dfmElementValue lang="ENU" value="|Determines how often Broker polls every server" changed="true"/>
      <dfmElementValue lang="CHS"
value="|Å•Ä•Å¶Å•Ä´Å•ÅéÅÅÅ–Å•Å¯Å/
ÅéÅ,Å¶Å•Å¾ÅŽÅÅ_Å†Å•ÅµÅ_Å†Åµ ÅÅŠ" changed="false"/>
      <dfmElementValue lang="DAN" value="d|Determines how often Broker polls every server" changed="false"/>
      <dfmElementValue lang="DEU" value="|Bestimmt, wie oft der Broker jeden Server abfragt" changed="false"/>
      <dfmElementValue lang="ESN" value="Determina la frecuencia con la que elbroker realiza esta" changed="false"/>
      <dfmElementValue lang="FRA" value="DÂ´termine la frÂ´quence Â laquelle Broker interroge chaque" changed="false"/>
      <dfmElementValue lang="KOR"
value="|Å•Å•Å·Å_ÅÅéÅ‡Å*Å¢Å¼ÅÅ´Å¶Å†Å*Å,ÅµÅ*Å*ÅµÅµÅ*
Å?Å¤Å¤" changed="false"/>
    </dfmElement>
  </dfmFile>
</Resource>
                    © NCR Corporation 2005
```

In some embodiments, each time the language translation and management system 100 is processed a log may be generated. The log includes a descriptive account of the processing that has taken place. The name and location of the log are configurable attributes of the log generation process. For example, the log may be generated as a file with a name such as "LOG_YYYYMMDDHHMM.out," where "YYYY" is a four-digit year, "MM" is a two-digit month, "DD" is a two-digit day, "HH" is a two-digit hour, and the last "MM" is a two-digit minute. In other cases, the log information may be updated to a data store table.

It has now been demonstrated how a language translation and management system 100 is implemented to improve language translation and language management. With this system 100, enterprises may quickly enter new foreign markets, since the error messages, screen labels, or other content information associated with enterprise products can be efficiently distributed from a base language to each foreign market's language. Furthermore, administration and management is controlled within a centralized master language data structure 104. Also, customers of the enterprises may add language and dialects to languages in an automated and seamless manner.

Figure 2:
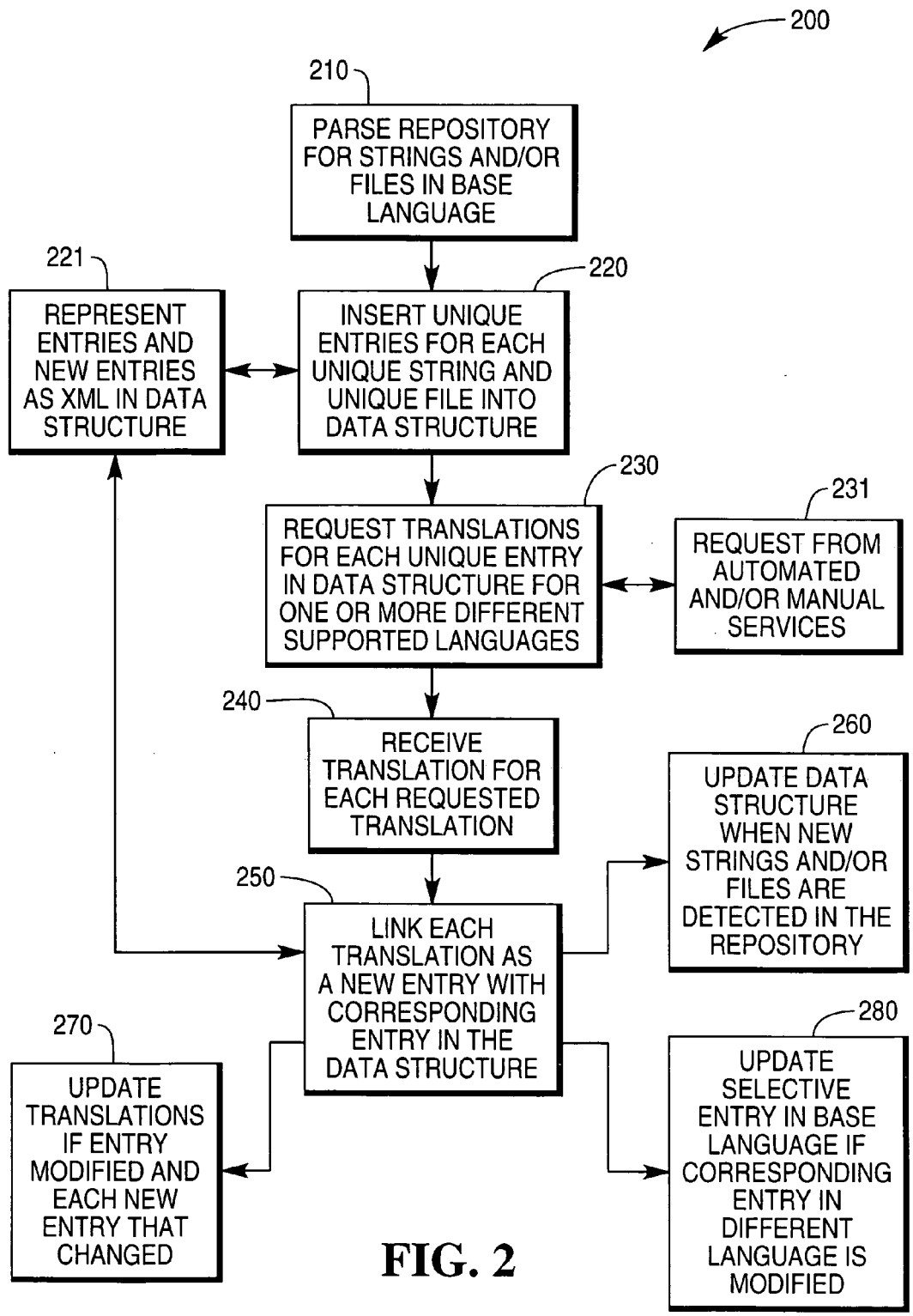
FIG. 2 is a diagram of a method for establishing and managing language translations, according to an example embodiment.

FIG. 2 is a diagram of a method 200 for establishing and managing language translations, according to an example embodiment. The method 200 (hereinafter "language managing service") is implemented in a machine-accessible and machine-readable medium and is accessible over a network. In an embodiment, the language managing service represents the processing of the language creator 101, the language linker 102, the language requestor 105, and the language updater 106 presented in the language translation and management system 100 of FIG. 1.

At 210, the language managing service parses a repository for strings or files in a base language. The repository may be a directory, a data store table, and the like. The identity of the repository may be provided as a command line argument or an environmental variable to the language managing service.

At 220, the language managing service inserts unique entries for each unique string and each unique file into a master language data structure. An example of a master language data structure 104 was provided above with the language translation and management system 100 of FIG. 1.

An entry may also be associated with a unique identifier. Furthermore, an entry for a string may include the string text while an entry for a file may include an identifier for the file. In this manner, strings, or entire documents may be represented within the master language data structure. Also, each entry is in a base language format. In an embodiment, the base language format is the English language.

According to an embodiment, at 221, the entries may be represented within the master language data structure as XML encoded entries having text in the base language format. The other additional entries, which are added to the master language data structure and described more completely below, are also encoded in XML and each additional entry or new entry is in text associated with a translation for a different supported language.

At 230, the language managing service requests translations for each unique entry included within the master language data structure. Each requested translation is in a different supported language from that of the other requested translations and from that of the base language.

In an embodiment, a language requestor 105 may be used to request translations for each entry of the master language data structure. Accordingly, at 231, the translations may be requested from automated services that provided translations for target languages or the translations may be requested from manual services.

At 240, the language managing service receives a single translation for each requested translation. That is, each desired language that is different from the base language is associated with a translated version of the string entry or file identifier entry in the master language data structure.

At 250, the language managing service then links each translation as a new entry in the master language data structure with its corresponding base language entry. At this point, the language translations are ready to be distributed from the master language data structure by other interfaces or services, such as the language distributor 103 of the language translation and management system 100 of FIG. 1.

In an embodiment, at 260, the language managing service may also update the master language data structure when new base language strings or files are detected in the repository. This will entail acquire the translations and linking the new translations as new entries within the master language data structure as well.

Moreover, in some situations, at 270, the language managing service may also provide this updating for changes detected in a base language entry of the master language data structure. This will entail updating the other dependent translation entries as appropriate.

According to an embodiment, at 280, the language managing service may in some cases monitor and detect changes or modifications in translations associated with a base entry. An update in this situation may entail updating the base language entry and the associated other translations associated with the base language.

The process of updates may be handled by the language updater 106 presented with the language translation and management system 100.

Figure 3:
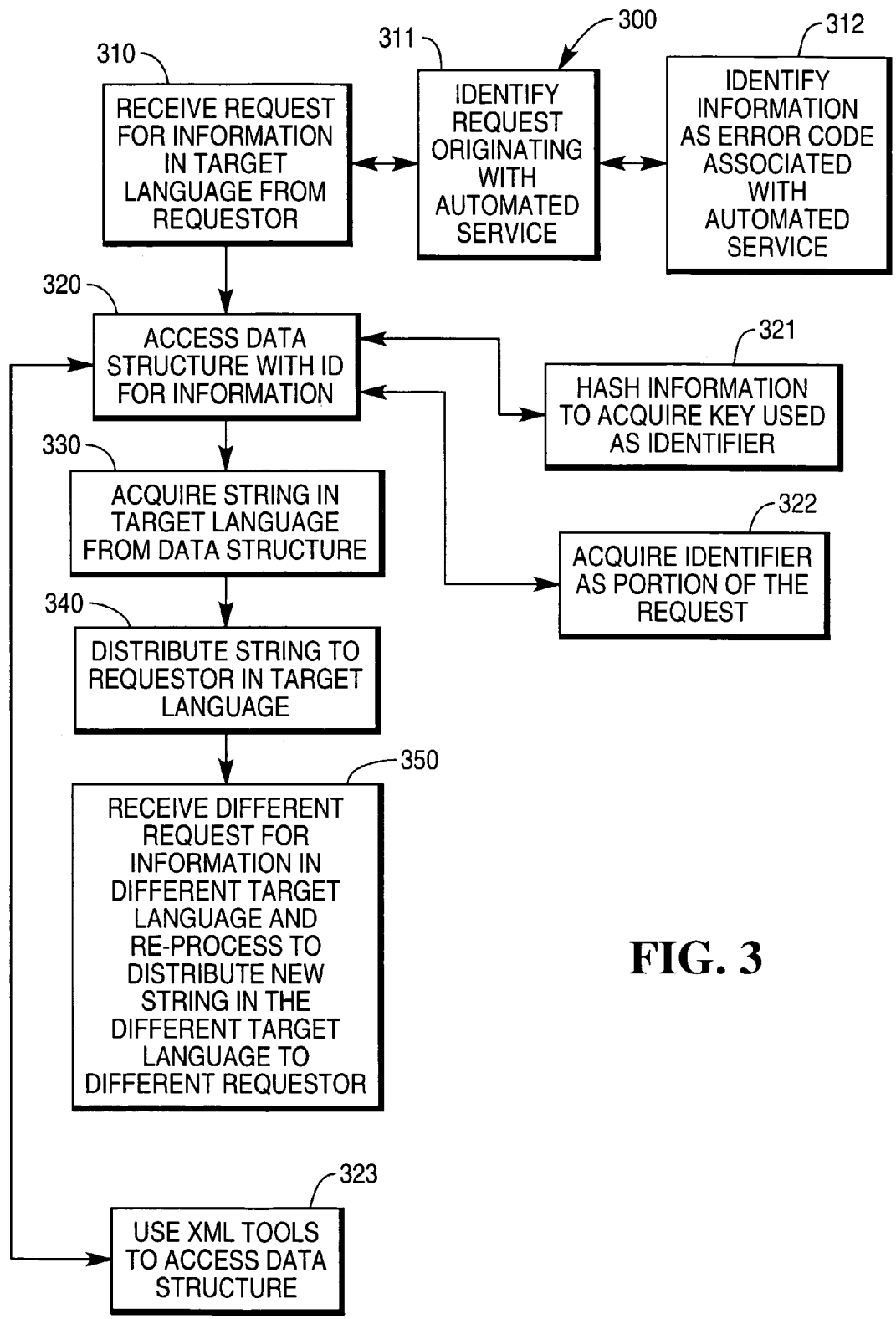
FIG. 3 is a diagram of a method for distributing requested language translations, according to an example embodiment.

FIG. 3 is a diagram of a method 300 for distributing requested language translations, according to an example embodiment. The method 300 (herein after "translation service") is implemented in a machine-accessible and readable medium and is accessible over a network. In an embodiment, the translation service represents the processing of the language distributor 103 of the language translation and management system 100 of FIG. 1.

At 310, the translation service receives a request for information. The information is requested in a target language from a requestor. The requestor may be a manual resource, such as an administrator or end user that uses an interface to interact with the translation service. Alternatively, at 311, the requestor may originate from an automated service, such as an interface associated with a service.

According to an embodiment, at 312, the requestor may express the information being requested as an error or message code. The code assist the translation service in uniquely identifying an entry in a master language data structure, such as the master language data structure 104 of the language translation and management system 100 of FIG. 1.

At 320, the translation service accesses a master language data structure with an identifier for the information. In some cases, the identifier may be the requested information in a base language. In other cases, at 321, the information being requested may be used to hash a key, which serves as the identifier. In still other situations, at 322, the identifier may actually be included with the request, such as in the embodiment, at 312, where the information requested is expressed as a code. Various combinations of these techniques may also be used together for purposes of acquiring the identifier for accessing the master language data structure.

In an embodiment, at 323, the entries included in the master language data structure may be in XML data format. Accordingly, the translation service may use a variety of XML tools to access and acquire entries from the master language data structure. It is to be understood, however, that the master language data structure may be a data store, a directory, a non XML file, a memory structure, and other types of logically organized data.

At 330, the translation service acquires a string or a file identifier in a target language, which was requested, from the master language data structure. Again, the request includes an identification of the desired language for the requested information. In some cases, the identity of the requestor may dictate the target language for the translation service.

At 340, the translation service distributes the string in the target language format to the requestor. According to an embodiment, at 350, the translation service may subsequently receive other requests for the same information but for that same information in a different target language format. The processing of 320-340 may be repeated or re-processed for the different requestor and the different target language, such that a different string in the different target language is supplied to the different requestor.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system, comprising:
a machine configured to execute a language creator that resides in a non-transitory computer-readable medium;
the machine also configured to execute a language linker that resides in a non-transitory computer-readable medium; and
the machine further configured to execute a language distributor that resides in a non-transitory computer-readable medium, the language creator is to create entries for a base spoken language in a master language data structure, the language linker links a single additional entry for each entry in the master language data structure, each single additional entry is associated with each different supported spoken language, and each single additional entry housed in a different repository from remaining additional entries, and the language distributor is to distribute selective ones of the entries or selective ones of the additional entries, and each entry includes a base string in the base spoken language and a plurality of additional strings that are matched to that entry via the base string and each additional string is in a different spoken language from the base spoken language of the base string, the master language data structure providing version control on the entries, each entry identified by a combination of a numeric value and an identifying string and at least one of the different spoken languages include a specific dialect for a given spoken language.

2. The system of claim 1, wherein the language creator is to create the entries from a repository comprising the directories, wherein the repository includes strings in the base spoken language or includes files in the base spoken language.

3. The system of claim 1 further comprising, a language requestor to request a language translation from one or more resources for each entry in the different supported spoken languages.

4. The system of claim 1, wherein the master language data structure is at least one of a file, a directory, and a data store table.

5. The system of claim 4, wherein the master language data structure is an extensible markup language (XML) encoded file.

6. The system of claim 1 further comprising, a language updater to add a new entry to the master language data structure in the base spoken language and to communicate with the language linker to acquire new additional entries for the new entry in the different supported spoken languages.

7. A method residing in a nor-transitory computer-readable medium and
   executed by a machine, the method comprising:
   parsing, by the machine, a repository for strings and files a base language, the base language is a native language for the strings that are to be matched to within a master language data structure;
   inserting, by the machine, unique entries for each unique string and each unique file in the master language data structure and within the base language, each unique entry identified by a numeric value and an identifying string and at least one of a different language including a specific dialect for a given language and the unique entries providing version control;
   partially housing, by the machine, the master language data structure in memory of the machine;
   requesting, by the machine, translations for each unique entry for different supported languages, each translation requested is for a particular one of the different supported languages;
   receiving, by the machine, a translation for each requested translation; and
   linking, by the machine, the translations to their corresponding unique entry within the master language data structure, and particular translations are supplied to requestors when particular strings in the base language are provided by the requestors and those particular strings are used to find matches in the master language data structure to particular entries for those particular strings in the base language for purposes of returning to the requestors the particular translations, the requestors are automated software resources.

8. The method of claim 7 further comprising, representing, by the machine, the entries and new entries within the master language data structure in extensible markup language (XML) format.

9. The method of claim 7, wherein requesting further includes requesting a number of the translations from automated language conversion services and requesting other ones of the translations from manual language conversion services.

10. The method of claim 7 further comprising:
   updating, by the machine, a number of the translations if an entry is modified in the base language; and
   updating, by the machine, each new entry that is changed as a result of the updated translations.

11. The method of claim 7 further comprising, updating, by the machine, the master language data structure when added strings and/or files are detected in the repository with added entries in the base language and added new entries in the one or more different supported languages.

12. The method of claim 7 further comprising, updating, by the machine, a selective entry in the base language if one or its corresponding entries in the one or more different supported languages is detected as having been modified.

* * * * *